US012632239B2

(12) United States Patent
Chan et al.

(10) Patent No.: US 12,632,239 B2
(45) Date of Patent: May 19, 2026

(54) APPROACH TO USER PROVISIONING WHEN SHIFTING A NON-CLOUD PLATFORM TO THE CLOUD

(71) Applicant: JP Morgan Chase Bank, N.A., New York, NY (US)

(72) Inventors: Ricky Chan, Woodside, NY (US); Vijaya Basker Balakrishnan, Coppell, TX (US); Kanishka Hettiarachchi, Chatham, NJ (US); Robert Kong, Flushing, NY (US); Ross Indyke, NY, NY (US); Jeremy Wellmeier, Hilliard, OH (US); Ramesh Krishnamurthy, Prosper, TX (US); Robert Spinelli, Hazlet, NJ (US); George Irizarry, Celina, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 365 days.

(21) Appl. No.: 18/516,575

(22) Filed: Nov. 21, 2023

(65) Prior Publication Data

US 2025/0165242 A1 May 22, 2025

(51) Int. Cl.
*G06F 8/61* (2018.01)

(52) U.S. Cl.
CPC ...................................... *G06F 8/63* (2013.01)

(58) Field of Classification Search
None
See application file for complete search history.

(56) References Cited

U.S. PATENT DOCUMENTS

| | | | | |
|---|---|---|---|---|
| 9,871,851 | B2 * | 1/2018 | Todd | G06F 9/45558 |
| 10,951,624 | B2 | 3/2021 | Kurup et al. | |
| 11,758,393 | B1 * | 9/2023 | Stolbikov | H04L 9/3247 |
| | | | | 713/171 |
| 11,928,491 | B1 * | 3/2024 | Zhang | G06F 8/63 |
| 2010/0318609 | A1 * | 12/2010 | Lahiri | G06F 9/5072 |
| | | | | 713/153 |
| 2012/0311106 | A1 * | 12/2012 | Morgan | G06F 9/45558 |
| | | | | 709/220 |
| 2021/0224099 | A1 * | 7/2021 | Luo | G06F 8/63 |
| 2021/0329003 | A1 * | 10/2021 | Segal | H04L 63/104 |
| 2022/0311626 | A1 * | 9/2022 | Gundavelli | H04L 9/0894 |
| 2022/0413903 | A1 * | 12/2022 | Kalley | G06F 9/5072 |
| 2023/0129824 | A1 * | 4/2023 | Hettiarachchi | H04L 63/104 |
| | | | | 726/4 |

(Continued)

*Primary Examiner* — Philip Wang
*Assistant Examiner* — Rongfa P Wang
(74) *Attorney, Agent, or Firm* — Wood IP, LLC; Theodore A. Wood

(57) ABSTRACT

Per one example embodiment, a method is provided of shifting an OS (operating system) and associated native application platform from a private network to a cloud-based target environment, where the OS comprises an operating system not configured for web access. An image of the OS is provided that is suitable for installation on a target virtual machine in the cloud-based target platform. In lieu of moving user credentials of numerous current private network-based users of the OS—native application platform to the target environment, a passwordless credential-based OS command level communication brokering service is provided at the cloud-based target environment.

18 Claims, 5 Drawing Sheets

(56) References Cited

U.S. PATENT DOCUMENTS

| | | | |
|---|---|---|---|
| 2023/0188613 A1* | 6/2023 | Velammal | G06F 8/72 |
| | | | 709/203 |
| 2024/0005023 A1* | 1/2024 | Devarakonda | G06F 16/2246 |
| 2025/0068707 A1* | 2/2025 | Ranjan | G06F 21/31 |

* cited by examiner

Figure 3:
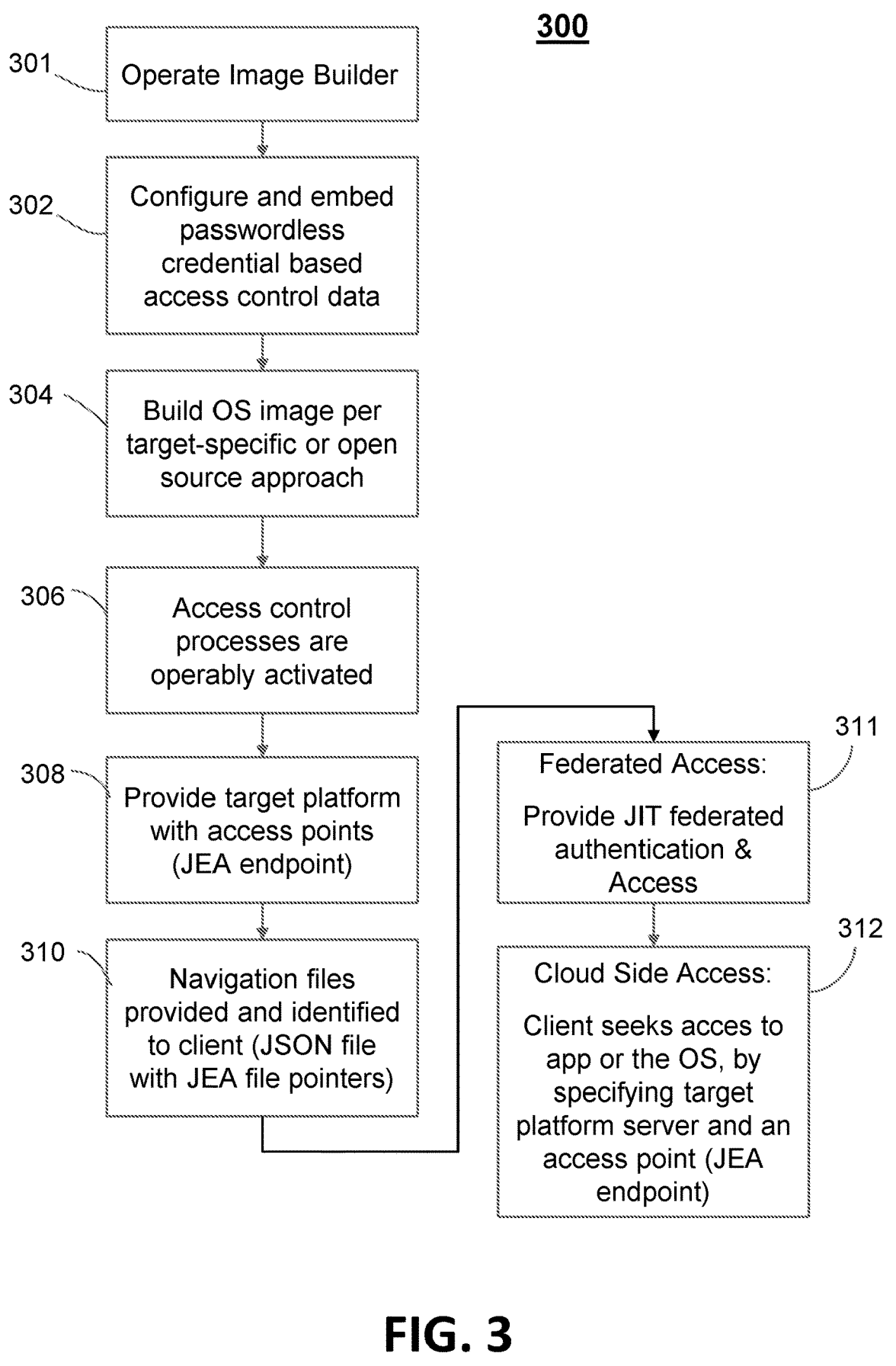

300

301 Operate Image Builder

302 Configure and embed passwordless credential based access control data

304 Build OS image per target-specific or open source approach

306 Access control processes are operably activated

308 Provide target platform with access points (JEA endpoint)

310 Navigation files provided and identified to client (JSON file with JEA file pointers)

311 Federated Access:

Provide JIT federated authentication & Access

312 Cloud Side Access:

Client seeks acces to app or the OS, by specifying target platform server and an access point (JEA endpoint)

APPROACH TO USER PROVISIONING WHEN SHIFTING A NON-CLOUD PLATFORM TO THE CLOUD

BACKGROUND OF THE DISCLOSURE

Field of the Disclosure

Embodiments of the present disclosure generally relate to approaches for user identity management when migrating to the cloud.

User authentication generally involves confirmation that a given user is authorized to access an information technology (IT) system, and the granting of access to the IT system. Federated identity management (FIM) systems rely on user authentication in one domain to facilitate the user's access to another domain. System for cross-domain identity management (SCIM) is an open standard approach for managing user identity information, for example, by automating the process of setting up, updating, and tearing down user identity accounts across domains.

Many organizations are moving applications native to non-cloud operating systems, to the cloud. A few ways for carrying out this migration include lift and shift, where both the application and operating system are moved unchanged to a cloud platform, and replat forming, where both application and operating system are moved (shifted) with some refactoring.

If the onboarded operating system is a non-cloud ready operating system such as Windows 10, FIM systems alone, generally operable at a transport layer per call level, are unable to provide command level access to the operating system and application on the new platform. Accordingly, when a non-cloud operation system and associated native application platform is shifted to a cloud platform, it is necessary to reestablish (i.e., relocate) the user authentication information for all current users to the new platform.

SUMMARY OF THE DISCLOSURE

An objective of the present disclosure is to improve the process of onboarding a non-web application, for example, a native enterprise application with many current users running on a non-cloud operating system such Windows, onto a public cloud platform such as an AWS (Amazon Web Services) or Microsoft Azure platform.

Another objective of the present disclosure is to ease the process of onboarding the current users of a non-web solution to the public cloud, especially with regard to user provisioning and authentication.

A further objective of the present disclosure is to onboard, provision, and manage ongoing access provided to users of an enterprise application in a migrated public cloud platform such as AWS or Microsoft Azure, without requiring the creation of a Windows login for each and every user, for example, in the target cloud virtual machine environment.

A further objective is to provide users with just enough administration access to the shifted application and operating system, by linking a local process credential (e.g., the current pre-migration windows login credentials) to a federated identity and ultimately to the cloud platform's identity access management control plane. This should be done while maintaining the ability to trace each session using the cloud-based application to the specific user and other information for security and auditing purposes.

One or more alternate or additional objectives may be served by the present disclosure, for example, as may be apparent by the following description. Embodiments of the disclosure include any apparatus, machine, system, method, articles (e.g., computer-readable media encoded to cause certain acts), or any one or more sub-parts or sub-combinations of such apparatus (singular or plural), system, method, or article (or encoding thereon or therein), for example, as supported by the present disclosure. Embodiments herein also contemplate that any one or more processes as described herein may be incorporated into a processing circuit.

Per one example embodiment, a method is provided of shifting an operating system (OS) and associated native application platform from a private network to a cloud-based target environment, where the OS comprises, an operating system not configured for web access. An image of the OS is provided that is suitable for installation on a target virtual machine in the cloud-based target platform. In lieu of moving user credentials of numerous current private network based users of the OS and associated native application platform to the target environment, a password less credential based OS command level communication brokering service is provided at the cloud-based target environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a flow chart of an example process for establishing session level passwordless authentication access.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure.

Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In embodiments of the present disclosure, a non-web authentication protocol compatible operating system (e.g., a Microsoft OS such as Windows 10) and associated native application are onboarded to a public cloud system, for example Microsoft Azure or AWS. The application has numerous human user accounts that will need access to the application in its new environment. Providing user access to the OS and application in the new cloud-hosted environment presents challenges for a number of reasons. For example, non-web Windows OS based applications use a traditional Windows authentication process relying on Active Directory or local Windows login accounts. Therefore, absent moving all the login information for the current users to the new environment, there is no current way to provide those users with access to the new environment.

In shifting a Windows-based application to the cloud, it is possible to create the Windows user accounts in the public cloud virtual machine instance. This would require recreating all the individual Windows accounts, including the login credentials, in the cloud system. This is a burdensome process for organizations with many accounts, and lacks security. In addition, this approach would not be readily scalable for large accounts.

Rather than recreating the individual accounts at the target platform, in embodiments, a federated identity management approach is employed for establishing attribute-based access to the target platform for transport level connection. A command level communication brokering service is employed for providing per client access to the shifted operating system and associated application. This is done while providing a full traceability of the identity and attributes of users for each session.

Figure 1:
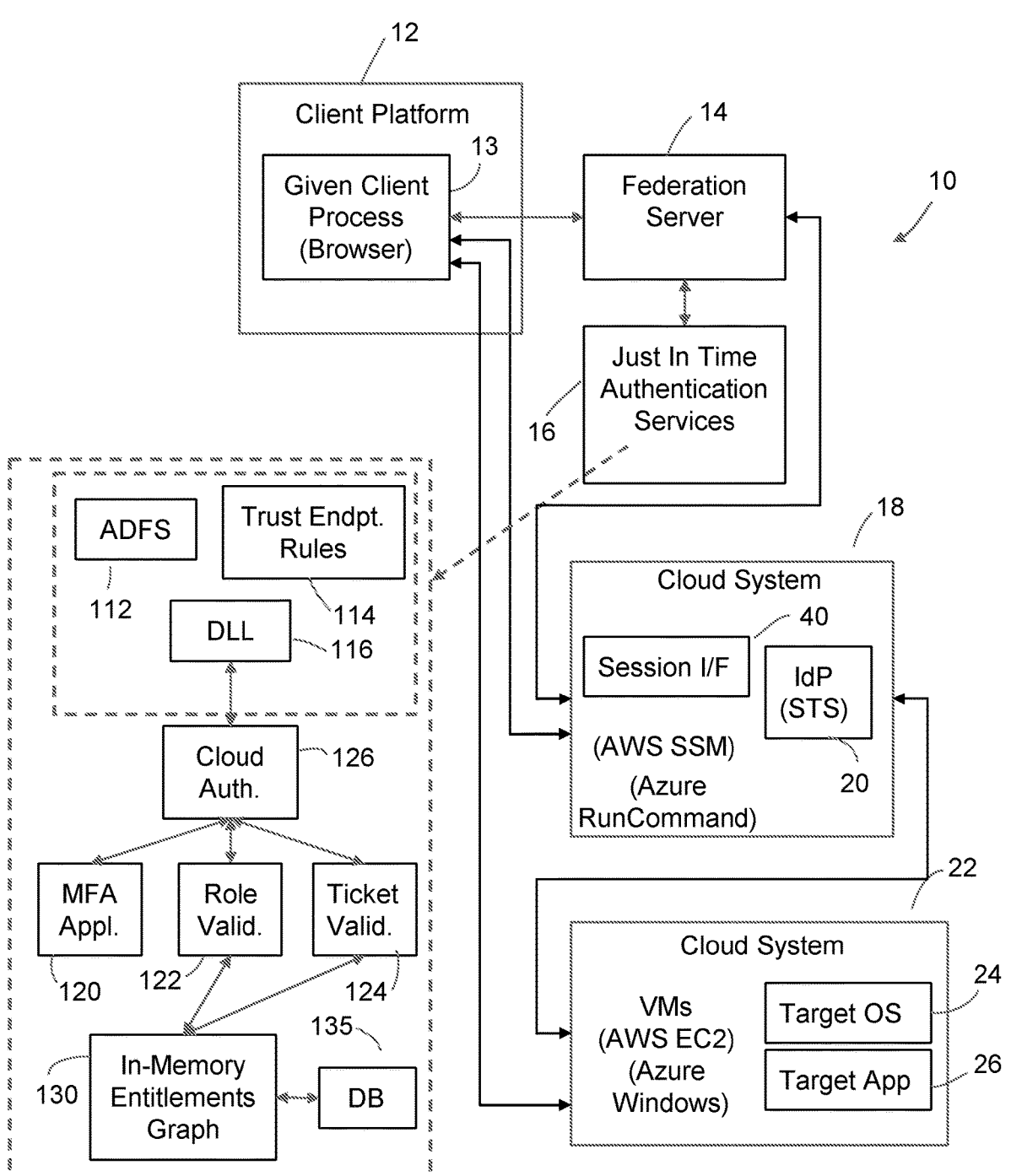
FIG. 1 is a block diagram of an example cloud-based enterprise system.

Referring now to the drawings, FIG. 1 is a block diagram of one embodiment of a cloud-based enterprise system 10, that includes, among other elements, a client platform 12 comprising a given client process 13 that provides a given user with access to a target application 26 in a cloud system 22. More specifically, a client platform 12 is provided, that may comprise a given computer, device, or a private network, through which a given client process is provided access to a cloud system 22 via a federation server 14, and a cloud server 18.

Cloud system 22 includes one or more virtual machines on which a shifted OS and native application are operably provided. In the illustrated embodiment the OS is a target OS 24, and the native application is a target application 26. In the illustrated embodiment, the given client process is one of numerous client processes (not shown) on common or different client platforms and operated by respective numerous users of the target application which is an enterprise application. The given client process 13 of illustrated embodiment is a browser, for example, Internet Explorer, Chrome, or Apple Safari. Per other embodiments, a given client process may comprise a network terminal, or another process or device.

Federation server 14 is connected to a just in time authentication services system 16, which may, in one example embodiment, be configured to provide just in time authentication management functionality, for example, as disclosed by published US Patent Publication No. 2023/0129824, entitled Systems and Methods for Cloud Federated Token Just In Time Authorization, published on Apr. 27, 2023, and filed Oct. 21, 2023 in the names of HETTIARACHCHI et al. (the '824 published application). The content of the '824 published application is hereby expressly incorporated by reference herein in its entirety.

Per the '824 published application, a user of a given client, in this case a user of given client process 13 in FIG. 1, accesses a federation service login page at federation server 14, and enters their individual login credentials. Federation server 14 may be implemented as described in the '824 published application, as shown in FIG. 1 herein. Accordingly, in the illustrated embodiment of FIG. 1, federation server 14 and a portion of just in time authentication services server 16 correspond to organizational federation server 110 in FIG. 1 of the '824 published application.

Specifically, the illustrated JIT authentication services server 16 includes Active Directory Federation Services (ADFS) program 112, trust endpoint rules 114, and dynamic link library (DLL) plugin 116. In one embodiment, DLL plugin 116 may include instructions used by ADFS 112. DLL plugin 116 may include security challenge questions to be presented to a client executed by a user electronic device (not shown) in hypertext markup language (HTML) form.

Cloud authentication service 126 may be a backend service that responds to the client with the claims to be injected by ADFS server 112 into federated user login tokens. Cloud authentication service 126 may query a plurality of custom services (not shown) of the user before returning the claims for a security token, such as a security assertion markup language (SAML) token.

In one embodiment, the ADFS 112 using the DLL 116 may present an authentication page to the user electronic device. For example, the authentication page may request multi-factor authentication (MFA) appliance data (e.g., a public-key cryptosystem (RSA) SecurID passcode), a user role, ticket information, etc. Once received, the cloud authentication services 126 may validate the MFA appliance data with MFA appliance backend 120, may validate the user role with role validation service 122, and may validate ticket information with ticket validation services 124. In one embodiment, any suitable knowledge store validation may be used to validate the request.

Role validation services 122 and/or ticket validation services 124 may access in-memory entitlements graph 130. In-memory entitlements graph 130 may provide real-time entitlement checks and may provide "just in time" validation of organizational changes and incident management controls. For example, in-memory entitlements graph 130 may include an abstraction layer and repository for privileged infrastructure access entitlements. In-memory entitlements graph 130 may integrate with reference data systems, such as entitlements database 135, etc. to source entitlements reference data. It may also integrate with access provisioning systems for provisioning end-user privileges.

In one embodiment, in-memory entitlements graph 130 may be hosted by a server, a collection of servers, in the cloud, etc. In one embodiment, in-memory entitlements graph 130 may be accessed by an application programming interface (API) call.

Examples of in-memory entitlements graph 130 and entitlements database 135 are disclosed in U.S. Pat. No. 10,951,624, the disclosure of which is hereby incorporated, by reference, in its entirety.

The entitlements database 135 may provide an identification of asset entitlements to which users, groups of users, roles, etc. within an organization may have permission to access.

ADFS program 112 may generate the security token (e.g., a SAML token) for the user once cloud authentication services 126 has authenticated the information received from the user electronic device. Trust endpoint rules 114 may be configured in the form of configuration rules and/or policies for ADFS program 112. For example, trust endpoint rules 114 may govern the attributes returned by cloud authentication service 126 that may be included in the security token.

Trust endpoint rules 114 may also transform claims with regular expressions, and string replacements, etc. In one embodiment, trust endpoint rules 114 may dynamically specify the duration that access may be granted (e.g., in seconds, such as 3600 seconds). Session tags, which may be used to audit and reconcile the claims, were granted in the session in native cloud platform logs, etc. For example, a unique incident ticket number may be inserted as a session tag, and the session tag may later be used to pull the event associated with the unique incident ticket number from the cloud platform and verify the access time, user, resources accessed, etc.

In the illustrated embodiment of the present disclosure specifically, unlike as disclosed in the '824 published application, the target cloud system 22 may not be fully accessed with the token-based access provided by the federated identity management process alone. Rather, the federated temporary access security token provided to the given client process 13 will provide access to a session level password-less authentication process. Per the illustrated embodiments herein, the session level passwordless authentication process involves a role-based access by reference to one or more target platform access points. The session level passwordless authentication process occurs upon a client reaching a command interface at the target platform.

As described in greater detail below, for example, with reference to FIG. 2, a cloud access system 50 includes the cloud system 22 of a cloud access system 50 (3.g., target platform) is provided with an access control system 52 which may comprise one or more cloud servers. The illustrated access control system 52 includes a command interface 54 which may be a command line interface (CLI), for example, as provided by the AWS cloud or Microsoft Azure.

Command interface 54 may be configured to receive command line and scripting language, per the Web Services for Management (WS-Management) specification (see, e.g., ISO/IEC 17963:2013). In one embodiment, command interface 54 is configured for the Windows Remote Management (WinRM) Microsoft implementation of the WS-Management specification. This specification, among other things, uses distinct uniform resource locators (URLs) to point to files on the target platform. In the illustrated embodiments, this interface is provided a resource page accessed by the client upon being connected after the federated FIM process. This involves a SAML process and issuance of a SAML temporary access token that is stored at the client—in the browser in the illustrated embodiment. In the embodiments, the access control system 52 further includes a role-based access control (RBAC) process 56, provided for carrying out the session level passwordless authentication process.

Referring back to FIG. 1, given client process 13 is able to communicate generally with hypertext transfer protocol (HTTP) encapsulated protocols, with a cloud server 18 and a cloud system 22. Each of cloud server 18 and cloud system 22 may be systems controlled by a cloud service provider, e.g., by AWS, Microsoft Azure, or Google Cloud. Cloud server 18 and cloud system 22 may be the same system. In the embodiments, the cloud server 18 includes a session interface 40 and an identity provider (IdP), for example, a SAML IdP 20. The IdP may comprise an AWS security token service (STS). In other embodiments, an STS may be provided that is separate from the IdP. In the embodiment shown, IdP 20 manages identity information for principals (users), and provides authentication services.

Session interface 40 serves as a service provider for the SAML process, and therefore receives an SAML assertion from the client process 13 during the federated authentication process. Depending on the embodiment, session interface 40 may comprise a cloud API, and more specifically may comprise an AWS systems manager (SSM).

In operation, a user initiates a federated authentication at federation server 14, which involves requesting for access to the target application 26 or OS 24, or access to an intermediate service, e.g., to session interface 40 or to a cloud service console or cloud API. Then IdP 20 authenticates the user, for example, verifying the user's identity using multi-factor authentication. The federated authentication results in a SAML temporary access token being issued and saved in the client process, e.g., at the client's browser.

After the SAML temporary access token is obtained, the user may access the access control system in cloud system 22 and seek access to target OS 24 or target application 26. In the illustrated embodiment, target OS 24 and target application 26 are installed and run on one or more virtual machines or virtual machine instances. The virtual machines may comprise an AWS EC2 virtual machine instance, or an Azure Windows virtual machine.

Referring again to FIG. 2, a passwordless credential-based OS command level communication brokering service processing circuit is provided, which in the illustrated embodiment is RBAC authentication process 56. The illustrated RBAC authentication process 56 performs an access determination for a given user based on script or commands received from the given user. The access determination is based on one or more session configuration endpoints, a set of session configuration files, a set of role capabilities files, and sometimes one or more modules associated with the role capabilities files.

In the embodiments, read only and read write endpoints 96 and 98, respectively, are provided. In addition, session configuration files (PSSessionConfigurationFile (PSSC) files 90 in the embodiment) are provided which provide for given session configuration endpoint parameters associated with a corresponding session configuration endpoint which includes a read only or a read write endpoint in the example. The endpoint parameters provided in each session configuration file (PSSC files 90) include users allowed to create a session based on the given session configuration endpoint, and commands permitted users can run on the created session.

The illustrated RBAC authentication process 56 also comprises one or more role capabilities value sets for specifying roles and associated capabilities for those roles, that is, powershell role capability (PSRC) files 92. The associated capabilities comprise allowed commands users with the specified roles can submit to the shifted target platform. In the illustrated embodiment, the PSSC and PSRC files are PowerShell just enough administration (JEA) files. One or more modules, namely role module 94 in the illustrated embodiment, may be provided which may be associated with a role capability file.

FIG. 3 shows a flowchart of an exemplary embodiment process 300 for establishing session level passwordless authentication access to a given user. In block 301, an image builder is operated. In block 302, the process configures and embeds passwordless credential-based access control data with the operating system. In the illustrated embodiment, the access control is based on a role-based JEA administration process, through PowerShell remoting. WinRM is used by access management computers (the target cloud platform in the illustrated embodiment). The HTTP protocol is used by the access management computers to manage communication and control access.

In block 304, the OS image is built per target-specific or an open source approach. At block 306, access control processes are operably activated at RBAC authentication circuit 56. Here, JEA files and associated modules may be activated, based on the embedded access control that was included with the OS image. The JEA files may include PSSC, PSRC files, and associated modules (e.g., a role module).

At block 308, the target platform is provided with access endpoints pertaining to the access control process. These access endpoints may comprise JEA endpoints (mid.power-shell.jea.endpoint). These are established by session configurations to specify a role capability, for example, read only (RO) or read write (RW).

At block 310, navigation files are provided and identified to the client. In the embodiment, a JavaScript Object Notation (JSON) file with JEA file pointers is provided.

In the above-described blocks 300-310, the cloud side access system is set up and activated. At block 311, a given user via the client process 13 may seek access to the target platform, at which point the federated access process occurs. Here, a just in time (JIT) federated authentication and access process is carried out, for example, as described above with reference to FIG. 1 and as described below with reference to blocks 501-510 in the process shown in FIG. 4.

After block 311, the given user through use of the client process 13, further seeks access to the target OS and/or the target application. This occurs by the client process 13 specifying, among other things, the target platform server (e.g., command interface 54 of FIG. 2). This may also occur by specifying an access point corresponding to a desired capability in its request. At this point, the cloud side authentication and access is carried out, for example, as described above with reference to FIG. 2 and as described below with reference to blocks 512-524 in FIG. 4. At block 312, the user may seek access to the app or the OS.

Figure 4:
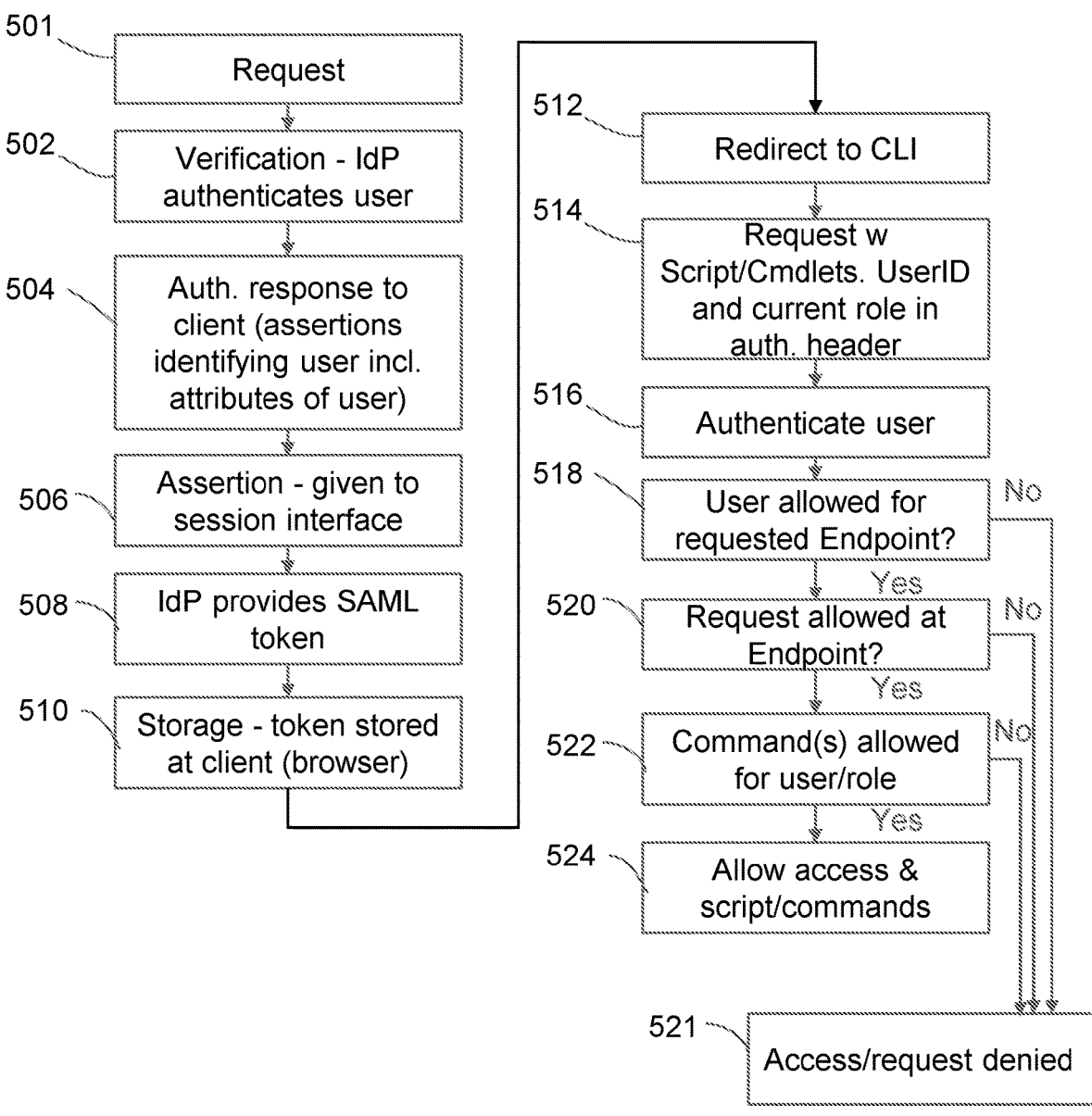
FIG. 4 is a flow chart of an example integrated enterprise authentication process for a cloud platform.

FIG. 4 shows a flow chart of an example integrated enterprise authentication process 500 for a cloud platform, starting with federated authentication and finishing with role based authentication at the target platform. In the embodiments shown, the federated authentication process is a token-based attribute-based access control (ABAC) process that generates a SAML federated user login token. The token is a temporary access SAML token, saved as an extensible markup language (XML) document carrying the authenticated principal (subject), security attributes describing the user, and the IdP (issuer). The token also carries information about the service process (conditions, audience restriction information), valid time frame, digital signature, subject confirmation method, how the principal was authenticated, and encryption information.

At block 501, a request is sent from client process 13 to IdP 20, for target application or target OS access, or access to an intermediate service (e.g., session interface 40. At block 502, verification occurs (i.e., IdP communicates with the JIT authentication services block 16) and authenticates the user. This includes verifying the identity of the user, for example, using multifactor authentication. At block 504, an authentication response is sent from IdP to client process 13, which includes an assertion identifying the user including attributes of the user.

At block 506, the client process 13 forwards an assertion to session interface 40. At block 508, IdP obtains and provides a SAML temporary access token to session interface 40. At block 510, client process 13 obtains and stores the temporary access token.

Figure 2:
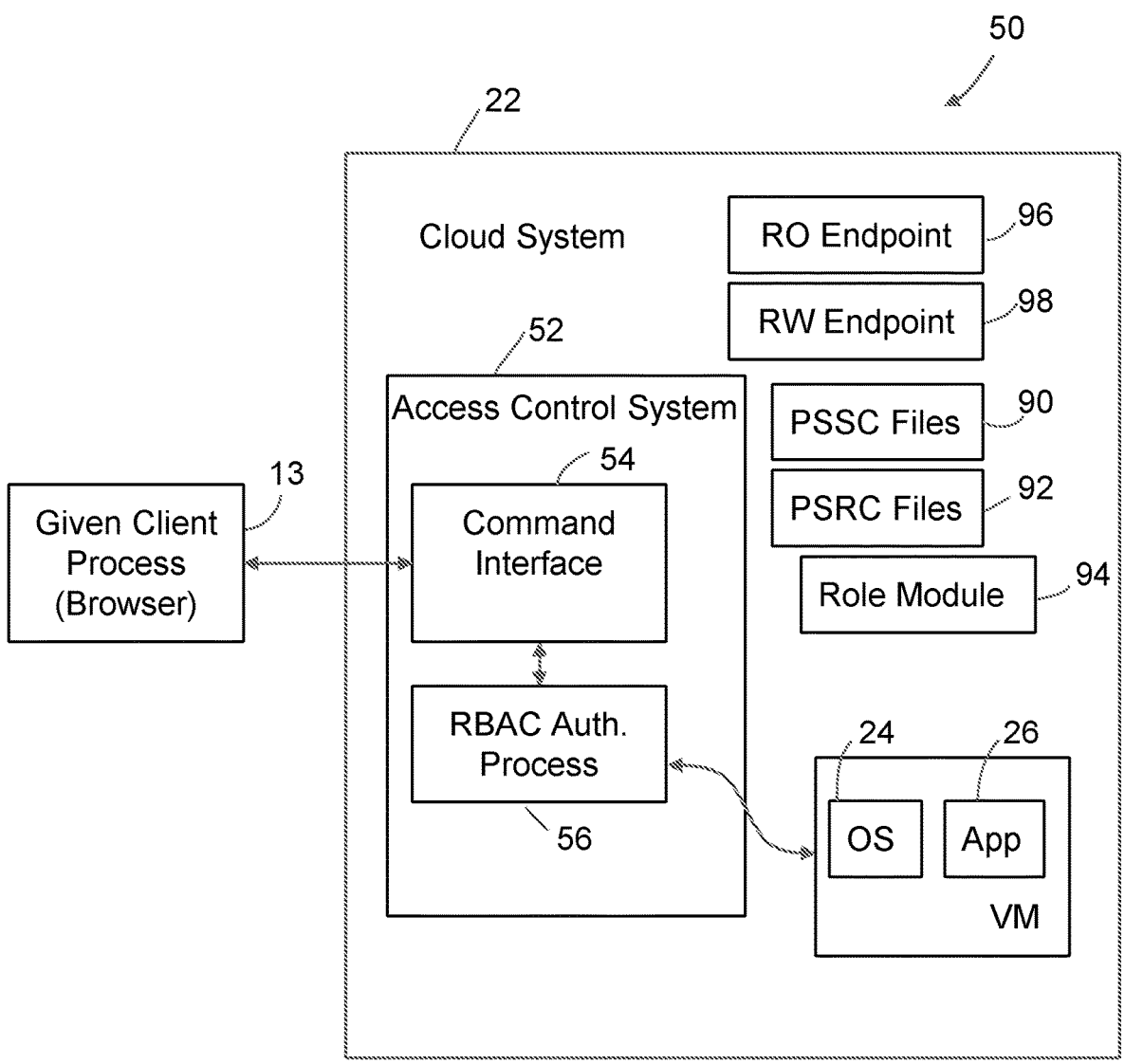
FIG. 2 is a block diagram of an example cloud access system.

Now that the user is authenticated, the client process 13 is given access to cloud system 22, by (at block 512) redirecting the client process 13 to command interface 54 shown in FIG. 2. At this point, a session level passwordless authentication process is initiated which in the illustrated embodiment is carried out by RBAC authentication process block 56. At block 514, command interface 54 receives a request from client process 13, with script and/or commands (cmdlets in one embodiment). An identifier of the user UserID and the user's current role are provided in an authentication header of the request.

As noted above, requests at this stage, via command interface 54, are provided per the WS-management specification and in accordance with the simple object access protocol (SOAP) protocol.

At block 516, the user is authenticated by referring to information in the authentication header of the request, and further by communication with IdP 20. At block 518, a determination is made whether the user is allowed for the requested endpoint, for example, RO endpoint 96 or RW endpoint 98. This can be determined by reference to the session configuration file corresponding to the requested endpoint. If the user is allowed, the process proceeds to block 520. If the user is not allowed, the process proceeds to block 521 where both access and the request are denied.

At block 520, a determination is made if something in the request, for example, a disallowed command, is not allowed at the endpoint. If the request is allowed, the process proceeds to block 522. If it is not, the process proceeds to block 521.

At block 522, a determination is made whether the requested commands are allowed for both the user and the role of the user that is associated with the request. This can be determined by reference to the role capability file and any associated modules, for example, one of the PSRC files 92 and role module 94. If the commands are allowed, then the process proceeds to block 524, where access is allowed for the script or commands, which are then forwarded to an operable command line interface. If the commands are not allowed the process proceeds to block 521.

It is noted that in the federated identity management process described above, a SAML token is created, and subject attributes are obtained and stored, for example, IdP 20, The subject attributes are therefore available for the requesting user. These attributes may include subject data (the requesting user's identity, the subject's roles, group membership, management level status, security clearance, etc.), resource data (things the given user seeks to access), action data (what the user wants to do, for example, write, edit, copy, delete, etc.), and environment data (context information, for example, time and location of access attempt, subject's device, communication protocols being used, encryption type and encryption strength, etc.).

One or more of these attributes may be considered in setting the role and capability information used to confine the role based access control process carried out in blocks 512-524 of the process 500. For example, the given user's current role, requested type of action, and other information from the attributes may be considered in the determinations made in blocks 518, 520, and 522. The federated identity management process described above, whereby a SAML token is created, may involve determination of a number of attributes of the requesting user.

These attributes may include subject data (the requesting user's identity, the subject's roles, group membership, management level status, security clearance, etc.), resource data (things the given user seeks to access), and action data (what the user wants to do, for example, write, edit, copy, delete, etc.). The attributes may also include environment data (e.g., context information, time and location of access attempt, subject's device, communication protocols being used, and encryption type and encryption strength, etc.).

One or more of these attributes may be considered in setting the role and capability information used to confine the role based access control process carried out in blocks 512-524. For example, the given user's current role, requested type of action, and other information from the attributes may be considered in the determinations made in blocks 518, 520, and 522.

Important identity, session, and other activity is tracked, for example, for later auditing. In one embodiment, and by way of example only and not limitation, this may be implemented using the AWS Cloud trail journaling service. In sign-in tokens, the following information is kept. This includes the person's identity, the "change ticket number" or "incident ticket" designation to justify the session, the start and end times of the session, the role assumed. This information may be included in the SAML token, and added to a log that is kept local to client process 13.

Figure 5:
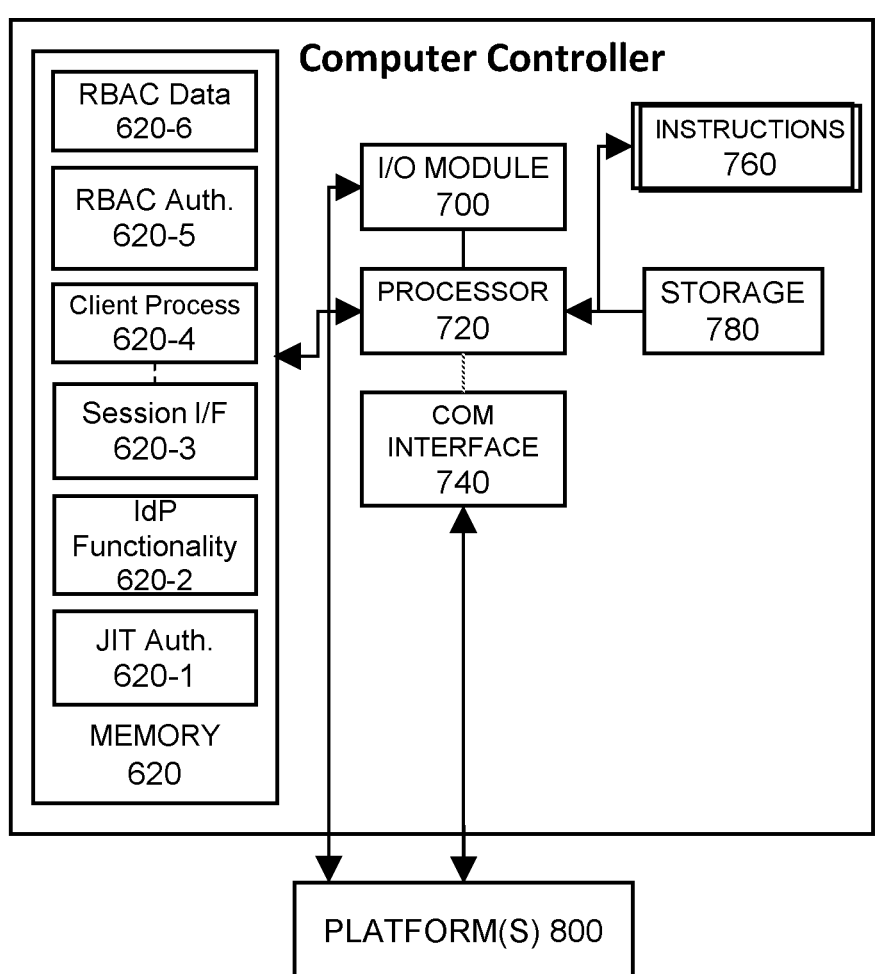
FIG. 5. is a block diagram of an example computer controller.

FIG. 5 illustrates a computer controller 600 that may be an application-specific hardware, software, and firmware implementation of the access control system 52 in FIG. 2, described above. The controller 600 may include a processor 720 configured to be executed on one or more, or all of the blocks of the system of FIG. 2, or the functions of the exemplary access control system 52, described above.

The processor 720 can have a specific structure imparted to the processor 720 by instructions stored in the memory 620 and/or by instructions 760 fetchable by the processor 720 from a storage medium 780. The storage medium 780 can be remote and communicatively coupled to the controller 600.

The controller 600 can be a stand-alone programmable system, or a programmable module included in a larger system. For example, the controller 600 may include or be connected with the access control system 52. For example, the controller 600 may include one or more hardware and/or software components configured to fetch, decode, execute, store, analyze, distribute, evaluate, and/or categorize information.

The processor 600 may include one or more processing devices or cores (not shown). In some embodiments, the processor 600 may be a plurality of processors, each having one or more cores. The processor 600, in another embodiment, may be a distributed processor. The controller 600 can execute instructions fetched from the memory 620, i.e., with reference to, among other code, instructions or data, one of memory modules 620-1, 620-2, 620-3, 620-4, 620-5, or 620-6.

Alternatively, the instructions can be fetched from the storage medium 780, or from a remote device connected to the controller 600 via the communication interface 740. Furthermore, the communication interface 740 can also interface with computer systems within a computer system of the access control system 52. An input/output (I/O) module 700 may be configured for additional communications to or from associated local and/or remote systems of one or more platforms 800 of the access control system 52.

Without loss of generality, the storage medium 780 and/or the memory 620 can include a volatile or non-volatile, magnetic, semiconductor, tape, optical, removable, non-removable, read-only, random-access, or any type of non-transitory computer-readable computer medium. The storage medium 780 and/or the memory 620 may include programs and/or other information usable by processor 720. Furthermore, the storage medium 780 can be configured to log data processed, recorded, or collected during the operation of controller 600.

The data may be time-stamped, location-stamped, cataloged, indexed, encrypted, and/or organized in a variety of ways consistent with data storage practice. The memory modules in memory 620 may represent specialized modules for various functions described in the embodiments herein. By way of example, the memory module 620-1 may represent a specialized module configured to implement aspects of the just in time authentication process described above.

Similarly, the memory module 620-2 may form a specialized IdP module, the memory module 620-3 may form a specialized session interface module, the memory module 620-4 may form a specialized client process module, the memory module 620-5 may form a specialized RBAC authentication process module, and the memory module 620-6 may form a specialized RBAC data module. The instructions embodied in these memory modules can cause the processor 720 to perform certain operations consistent with the functions described in FIGS. 1-4 above.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A method of user provisioning when shifting an OS (operating system)—native application platform from a private network to a cloud-based target environment, where the OS comprises an operating system not configured for web access, the method comprising:

providing an image of the OS suitable for installation on a target virtual machine in the cloud-based target platform; and providing, specific to the shifted OS-application, a passwordless credential-based OS command level communication brokering service at the cloud-based target environment, in lieu of moving user credentials of current private network-based users of an OS-application platform to the target environment, wherein the providing of a passwordless credential based OS command level communication brokering service comprises providing one or more session configuration endpoints at the cloud-based target environment, and providing for a given session configuration endpoint parameters associated with the given session configuration endpoint, the parameters including users allowed to create a session based on the given session configuration endpoint, and commands permitted users can run on the created session.

2. The method according to claim 1, further comprising providing, in the image of the OS, structured data for configuring the passwordless role-based OS command level communication brokering service.

3. The method according to claim 1, further comprising installing the OS image on the target virtual machine.

4. The method according to claim 3, further comprising operably activating the command level communication brokering service at the target environment, such that numerous current users can access the shifted and installed OS-application platform using command scripts of the shifted and installed OS via the communication brokering service.

5. The method according to claim 4, wherein the command level communication brokering service is activated on a remote management process.

6. The method according to claim 1, wherein the target virtual machine comprises a virtual machine instance.

7. The method according to claim 1, wherein the target virtual machine comprises an Amazon EC2 virtual machine.

8. The method according to claim 1, wherein the target virtual machine comprises an Microsoft Azure virtual machine.

9. The method according to claim 1, wherein the providing of a passwordless credential-based OS command level communication brokering service comprises providing one or more role capabilities value sets for specifying roles and associated capabilities for those roles, the associated capabilities comprising allowed commands users with the specified roles can submit to the shifted target platform.

10. Apparatus method of shifting an OS (operating system)-application platform from a private network to a cloud-based target environment, where the OS comprises an operating system not configured for web access, the method comprising: storage at the cloud-based target environment and operably coupled to a target virtual machine, the storage storing an image of the OS suitable for installation on a target virtual machine in the cloud-based target platform; and a passwordless credential-based OS command level communication brokering processing circuit at the cloud-based target environment comprising one or more session configuration endpoints at the cloud-based target environment, and providing for a given session configuration endpoint parameters associated with the given session configuration endpoint, the parameters including users allowed to create a session based on the given session configuration endpoint, and commands permitted users can run on the created session.

11. The apparatus according to claim 10, the image of the OS comprises structured data for configuring the passwordless credential-based OS command level communication brokering service.

12. The apparatus according to claim 10, wherein the target virtual machine is configured to install the OS image on the target virtual machine.

13. The apparatus according to claim 12, further comprising the command level communication brokering service processing circuit operably activated at the target environment, such that numerous current users can access the shifted and installed OS-application platform using command scripts of the shifted and installed OS via the communication brokering service.

14. The apparatus according to claim 10, wherein the target virtual machine comprises a virtual machine instance.

15. The apparatus according to claim 10, wherein the passwordless credential-based OS command level communication brokering service processing circuit comprises one or more computer memory encoded with role capabilities value sets for specifying roles and associated capabilities for those roles, the associated capabilities comprising allowed commands users with the specified roles can submit to the shifted target platform.

16. Non-transient computer readable media encoded to cause user provisioning when shifting an OS (operating system) and an associated native application platform from a private network to a cloud-based target environment, where the OS comprises an operating system not configured for web access, whereby the user provisioning comprises:

providing an image of the OS suitable for installation on a target virtual machine in the cloud-based target platform; and in lieu of moving numerous user credentials of numerous current private network-based users of the OS-application platform to the target environment, providing, specific to the shifted OS-application, a passwordless credential-based OS command level communication brokering service at the cloud-based target environment, wherein the providing of a passwordless credential based OS command level communication brokering service comprises providing one or more session configuration endpoints at the cloud-based target environment, and providing for a given session configuration endpoint parameters associated with the given session configuration endpoint, the parameters including users allowed to create a session based on the given session configuration endpoint, and commands permitted users can run on the created session.

17. The computer-readable media according to claim 16, further encoded such that the image of the OS includes structured data for configuring the passwordless role-based OS command level communication brokering service.

18. The computer-readable media according to claim 16, further encoded to cause installing the OS image on the target virtual machine.

* * * * *